United States Patent [19]

Johnson

[11] Patent Number: 4,655,078
[45] Date of Patent: Apr. 7, 1987

[54] SPRINKLER DRAIN AND TEST VALVE

[76] Inventor: Augustus W. Johnson, 70 W. 51 St., Hialeah, Fla. 33012

[21] Appl. No.: 696,525

[22] Filed: Jan. 30, 1985

[51] Int. Cl.⁴ .................. G01M 19/00; F16K 5/10
[52] U.S. Cl. .................... 73/168; 137/559; 251/207; 251/208
[58] Field of Search .............. 251/207, 208; 137/559; 73/168

[56] References Cited

U.S. PATENT DOCUMENTS

| 350,510 | 10/1886 | Stretch | 73/332 |
|---|---|---|---|
| 421,224 | 2/1890 | Applegarth | 251/207 |
| 926,774 | 7/1909 | Schmidt | 174/102 R |
| 1,056,344 | 3/1913 | Lester | 251/207 |
| 1,229,038 | 6/1917 | Cornelius | 251/207 |
| 1,264,775 | 4/1918 | Coles | 251/207 |
| 1,333,048 | 3/1920 | Webster | 251/207 |
| 1,666,918 | 4/1928 | Scoville | 184/96 |
| 1,757,237 | 5/1930 | Deutsch | 73/323 |
| 1,825,512 | 9/1931 | Durham et al. | 251/207 |
| 2,621,012 | 12/1952 | Graham | 251/207 |
| 2,660,560 | 11/1953 | Pickard | 137/559 |
| 2,859,611 | 11/1958 | Morse | 73/168 |
| 3,134,405 | 5/1964 | White et al. | 251/207 |
| 3,386,461 | 6/1968 | Fisher | 251/207 |
| 3,517,554 | 5/1968 | Smith | 73/332 |
| 3,817,097 | 6/1974 | Heroux | 73/168 |
| 3,854,497 | 12/1974 | Rosenberg | 137/557 |
| 4,130,128 | 12/1978 | Kaneko | 251/207 |
| 4,244,393 | 1/1981 | Lehtinen | 137/240 |

FOREIGN PATENT DOCUMENTS

| 0963446 | 2/1975 | Canada | 137/559 |
|---|---|---|---|
| 0042304 | 8/1908 | Switzerland | 137/559 |
| 0110371 | 1/1924 | Switzerland | 251/207 |

OTHER PUBLICATIONS

"Standard for the Installation of Sprinkler Systems", NFPA 13, 1983 Edition, pp. 13-135.

Primary Examiner—Charles Frankfort
Assistant Examiner—Thomas B. Will
Attorney, Agent, or Firm—Lane & Aitken

[57] ABSTRACT

A sprinker drain and test valve for testing a sprinkler system includes a housing, an inlet and an outlet disposed on either end of the housing, a ball valve disposed within the housing between the inlet and the outlet, the ball valve defining two channels that provide communication between the inlet and the outlet, the first of the channels allowing a flow substantially equivalent to that of one single sprinkler head in the system and the second of the channels allowing a relatively unrestricted flow, a handle for alternatively rotating the ball valve between a first position in which the first channel provides communication between the inlet and outlet and a second position in which the second channel provides communication between the inlet ad outlet, a portion of the ball valve for preventing communication between the inlet and the outlet, and a sight glass disposed downstream of the ball valve.

12 Claims, 7 Drawing Figures

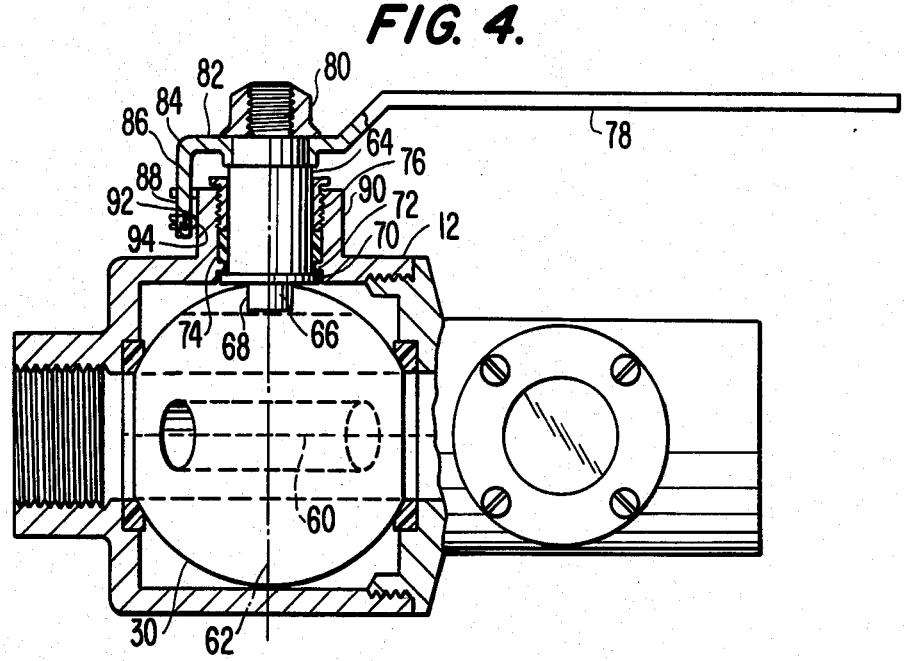
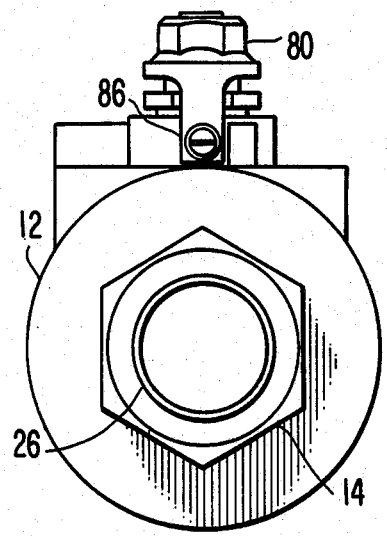
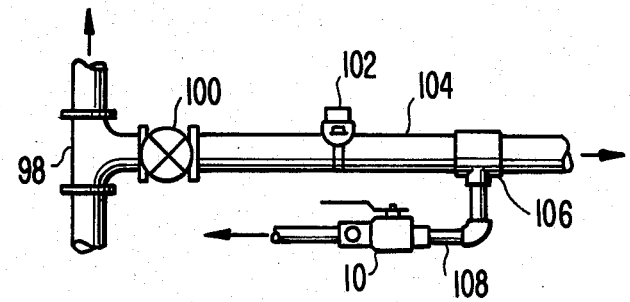
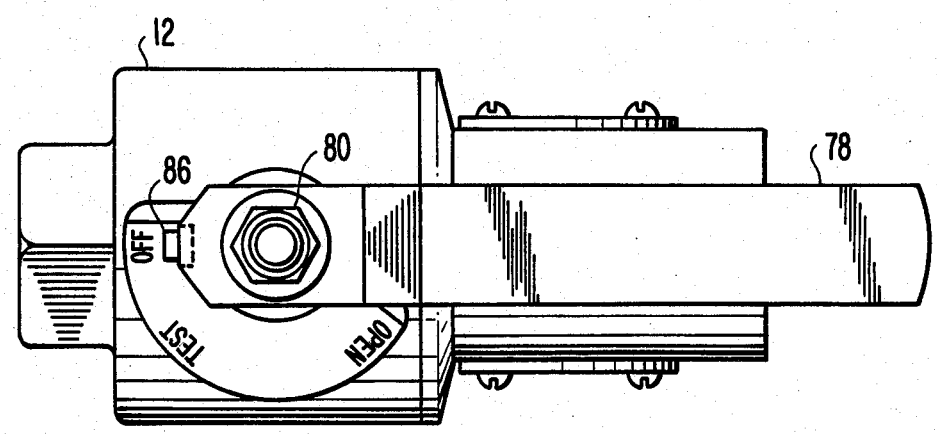

SPRINKLER DRAIN AND TEST VALVE

BACKGROUND OF THE INVENTION

1. Introduction

This invention pertains to a sprinkler drain and test valve and a method for draining and testing a sprinkler system.

2. Description of the Prior Art

In order to test and drain a fire sprinkler system, an apparatus is used in which a test valve, sight glass, and an orifice providing flow equivalent to the smallest sprinkler orifice in the system are typically located on one conduit in parallel with a second conduit in which an auxiliary drain valve is disposed. Such a system is described in NFPA Pamphlet Number 13 1983 edition at page 13-135, and especially at FIG. A-3-9.1.2. In this system, an indicating-type floor control valve having a supervisory switch is disposed adjacent to a system riser to control feed to a feed main. A water flow switch is provided along the feed main and, subsequent to the water flow switch, a shunt to the prior art drain and test apparatus supplies water from the feed main. Following the shunt, the water can be directed into one of two conduits, the flow through the first being controlled by an inspector's test valve and the flow through the second being controlled by an auxiliary drain valve. When the inspector's test valve is opened, the water passes through the conduit to a sight glass and then through a union having a corrosion-resistant orifice that provides the flow that is equivalent to the smallest sprinkler orifice in the system. While water is flowing through the test conduit, it can be viewed through the sight glass. Alternatively, when it is desired to drain the system, the auxiliary drain valve is opened and water freely flows from the shunt to a drain. In the system described in this reference, the test conduit and the drain conduit rejoin in a single conduit that carries water to the drain.

There are a number of disadvantages in the prior art test and drain apparatus. It is quite complex, consisting of various pipe nipples, fittings, an inspector's test valve, an auxiliary drain valve, a sight glass, and a union joining the test conduit to provide a restricted orifice, and this complexity results in increased costs of installation and operation, and decreased efficiency of use. Thus, there is a need in the art for an improved sprinkler system drain and test apparatus.

Accordingly, it is an object of the present invention to provide a sprinkler system drain and test valve that is easier and more economical to install and operate.

It is a further object of the present invention to provide a sprinkler drain and test valve that requires a minimum amount of space when installed.

It is a further object of the present invention to provide a sprinkler system drain and test valve that, with the operation of a single control, alternatively provides a flow of one sprinkler head, a flow that is unrestricted, or no flow at all through a drain and test conduit.

It is a further object of the present invention to provide a means for observing the flow through a drain and test conduit whether the conduit is carrying a restricted flow, an unrestricted flow, or no flow.

Other objects of the present invention will be apparent from the following detailed description of the preferred embodiments.

SUMMARY OF THE INVENTION

In accordance with the present invention, sprinkler drain and test valve for testing a sprinkler system is provided which comprises a housing, an inlet and outlet disposed on either end of the housing, a ball valve disposed within the housing between the inlet and outlet, the ball valve defining two channels providing communication between the inlet and the outlet, the first channel allowing a flow substantially equivalent to that of one sprinkler head in the system and the second channel allowing an unrestricted flow through the ball valve, a means for alternatively rotating the ball valve between a first position in which the first channel provides communication between the inlet and outlet and a second position in which the second channel provides communication between the inlet and the outlet, a means for preventing communication between the inlet and outlet, and a sight glass disposed downstream of the ball valve.

BRIEF DESCRIPTION OF THE DRAWINGS

FIG. 4 is a side view of the invention, in which one-side of the housing has been removed from a portion of the device.

FIG. 5 is an end view of the invention, taken from the supply side.

FIG. 6 is a top view of the invention.

FIG. 7 is a schematic diagram of a portion of a sprinkler system that comprises the invention.

DESCRIPTION OF THE PREFERRED EMBODIMENTS

The invention is a single-valve assembly that, through various positioning of a control handle, allows (1) a fire sprinkler system to be flow tested, i.e., allows a flow through the valve equivalent to the flow of one sprinkler head of the system, by allowing the pressurized system to discharge through the smaller of two channels provided in the valve, (2) a fire sprinkler to be drained, by allowing flow through the larger of the channels, or (3) no flow to pass through the drain and test apparatus. A built-in sight glass assembly allows an operator visual assurance of flow or lack thereof in any position, as it is disposed downstream of a ball valve that defines the two channels. The invention will be described in detail with reference to the accompanying drawings.

Figure 1:
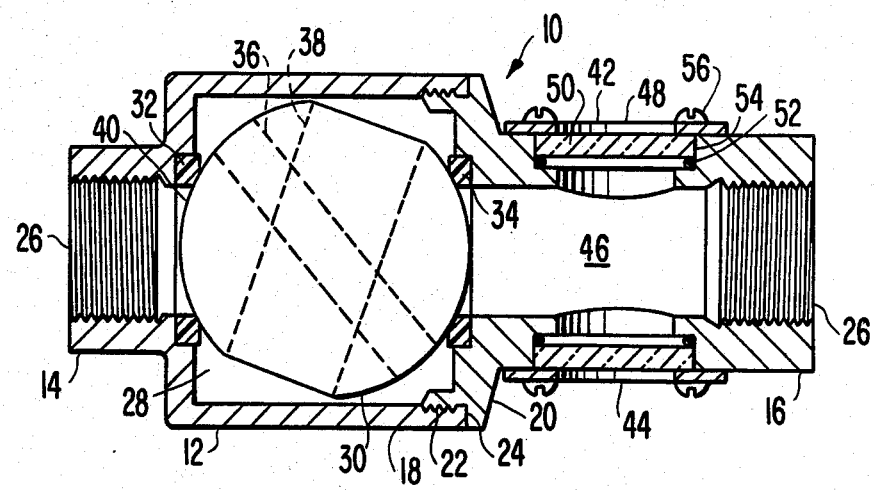
FIG. 1 is a bottom view of the invention with the lower one-half of its housing removed, depicting the ball valve in a closed position.

As depicted in FIG. 1, the sprinkler drain and test valve 10 comprises a housing 12, an inlet 14 and an outlet 16. The housing is composed of any suitable material, such as cast bronze and, in the embodiment depicted in FIG. 1, consists of two parts 18, 20, releasably connected to one another by threaded connection 22, the connection being sealed by Teflon seal 24. Inlet 14 and outlet 16 are each provided with a one inch pipe thread 26 for connecting the invention to a drain and test conduit of a sprinkler system.

Housing 12 defines a chamber 28, in which is disposed ball valve 30. The ball valve is composed of any suitable material, such as chrome-plated brass. In the depicted embodiment, the ball valve has a diameter of 2½ inches. The ball valve is sealed on both the inlet and outlet side by annular Teflon gaskets 32, 34, such that, in order for water to pass from inlet 14 to outlet 16, it must pass through ball valve 30.

As depicted by phantom lines in FIGS. 1 through 4, ball valve 30 comprises two channels 36, 38. Both of the channels extend through the center of ball valve 30 and are disposed on an equatorial plane. In the depicted embodiment, the channels intersect at and adjacent to the center of ball valve 30. Channel 36 has a cross-sectional area that allows a flow from inlet 14 to outlet 16 that is equivalent to the flow through one sprinkler head of the sprinkler. Channel 38 has a cross-sectional area that allows full flow drainage from inlet 14 to outlet 16. In the depicted embodiment, wherein the sprinkler drain and test valve is disposed in a conduit having a one-inch interior diameter, the desired flow through channel 38 is achieved by providing channel 38 with an interior diameter of one inch. In other systems, wherein the drain and test valve is disposed in a conduit having an interior diameter of 1¼ inch, channel 38 also has a diameter of 1¼ inch.

Figure 2:
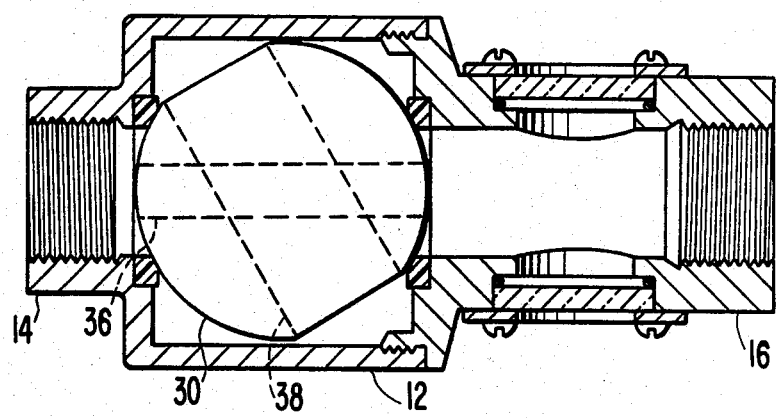
FIG. 2 is a bottom view of the invention with the lower one-half of its housing removed, depicting the ball valve in a test position.
Figure 3:
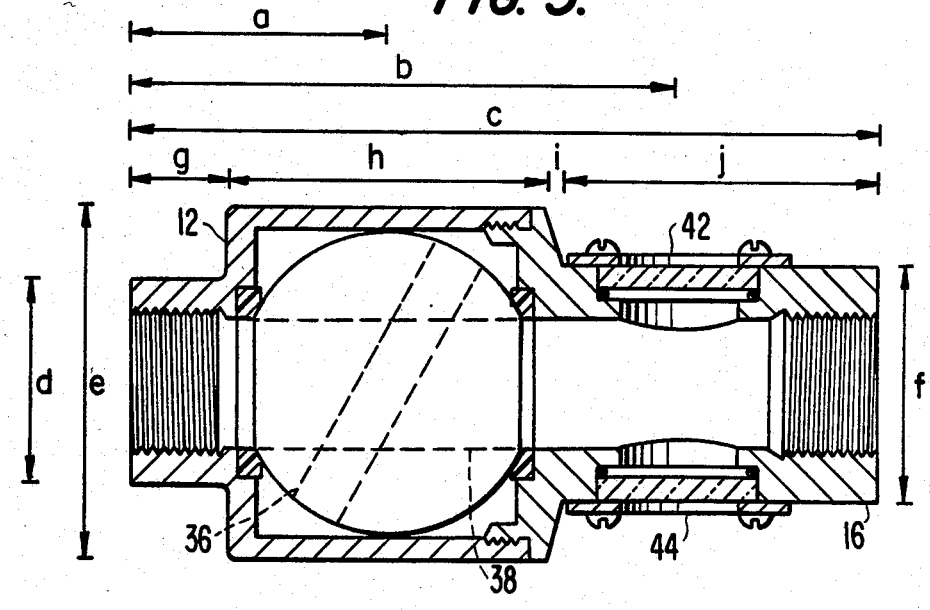
FIG. 3 is a bottom view of the invention with the lower one-half of its housing removed, depicting the ball valve in a drain position.

As depicted in FIGS. 1 through 3, ball valve 30 is alternatively disposed in one of three positions. In a first position, depicted in FIG. 1, ball valve 30 is disposed such that neither of channels 36, 38 communicates with inlet 14 or outlet 16, but instead flow from the inlet to the outlet is blocked by portion 40 of ball valve 30. In a test position, depicted in FIG. 2, ball valve 30 is rotated such that channel 36 provides communication between inlet 14 and outlet 16, whereby a flow equivalent to one sprinkler head of the sprinkler system passes from inlet 14 to outlet 16. Finally, in a drain position, as depicted in FIG. 3, ball valve 30 is rotated such that channel 38 provides communication between inlet 14 and outlet 16, whereby full-flow drainage is provided through the drain and test valve.

On the outlet side of ball valve 30, sight glass 42 is provided on at least one wall of part 20 of housing 12. In the preferred embodiment depicted in FIG. 1, the sight glass actually consists of two sight glasses 42, 44 disposed on either side of chamber 46, through which fluid passes after leaving chamber 36 or 38 of ball valve 30. Thus, it is possible to sight through chamber 46 through glasses 42, 44.

In the embodiment depicted in FIG. 1, each of sight glasses 42, 44 are composed of a washer 48, a window 50 and an "O" ring 52. In this embodiment, the washer is a stamped brass washer, the window is composed of glass and has the overall dimensions of 3/16 inches by 1⅜ inches, and the "O" ring is composed of neoprene elastomer. Window 50 and "O" ring 52 are received in annular slot 54 and secured by washer 48, which is in turn secured by screws 56. In this embodiment, screws 56 are 8/32 by ⅜ inch machine screws. This structure of sight glasses 42, 44 allows a viewing area having a diameter of one inch, which is as wide as chamber 46, such that observation can readily be made of the lack of flow in the closed position of valve ball 30, as well as the flow occurring when the ball valve is in a test or drain position, as depicted in FIGS. 2 and 3.

FIG. 3 identifies dimensions of the depicted embodiment, although it will be readily apparent to one skilled in the art that these dimensions can be modified to adapt the invention to different sprinkler systems. With this in mind, it is noted in FIG. 3 that dimension a, from the inlet end of the device to the center of ball valve 30, is 2⅛ inches. Dimension b, measured from the end of inlet end 14 to the center of sight glass 42, is 4⅞ inches. Dimension c, spanning the entire length of the device, is 6⅝ inches. Dimmsion d, which is the diameter of inlet 14, is 1¾ inches. Dimension e, which is the total width of the device, is 3 inches. Dimension f, which is the exterior diameter of outlet 16, is 1 15/16 inches. Dimension g, which is the depth of inlet 14, is ⅞ inches. Dimension h, which is the exterior longitudinal dimension of chamber 28, is 2¾ inches. Dimension i, which measures the width of sloping annular section 58, is ⅛ inch. Finally, dimension j, which measures the portion 20 of housing 12 on the outlet side of sloping section 58, is 2⅛ inches.

In FIG. 4, a means for rotating ball valve 30 is depicted. As indicated hereinabove, channels 36 and 38 are on the same equatorial plane 60 of ball valve 30 and, also, portion 40 of ball valve 30 is on the same equatorial plane, such that rotation of ball valve 30 on an axis 62 perpendicular to equatorial plane 60 allows ball valve 30 to achieve each of the positions depicted in FIGS. 1 to 3.

As depicted in FIG. 4, control shaft 64 shares axis 62 with ball valve 30 and rotational movements of shaft 64 causes identical movements of ball valve 30 by virtue of the fit of stem 66 of shaft 64 in receiving slot 68 of ball valve 30. In the embodiment depicted in FIG. 4, shaft 64 is retained adjacent to ball valve 30 by virtue of the cooperation of Teflon seal 70 within notch 72 of housing 12. Shaft 64 is also provided with annular Teflon packing 74 and packing nut 76. Shaft 64, is suitably a machined shaft composed of brass.

The rotation of shaft 64 and thus ball valve 30 is facilitated by handle 78 which is affixed to the top of shaft 64 by means of self-locking nut 80. In the depicted embodiment, the handle is 18-gauge and one inch wide and nut 80 is 5/16 inch in size. The front end 82 of handle 78 is provided with a 90-degree bend 84, such that downwardly extending portion 86 comprises a portion 88 that is adjacent to neck 90 of housing 12. On portion 88, a spring-loaded ball 92 is provided adjacent to a recess 94 in neck 90. In this fashion, recesses are provided at positions on neck 90 such that handle 78 and thus ball valve 30 are retained in desired positions. In a less preferred embodiment, no recesses are provided, but the spring action of ball 92 exerts a pressure which nevertheless helps maintain ball valve 30 in a selected position.

As best depicted in FIG. 6, an indicator plate 96 is provided on top of housing 12 to allow an operator to select between a open (drain) position, a test position, and an off position in which flow through the drain and test valve is blocked. By lining up downwardly extending portion 86 with the desired position indicated on plate 96, the desired position of ball valve 30 is achieved.

FIG. 7 depicts the drain and test valve of the present invention, as disposed in a portion of a sprinkler system. The depicted portion of the sprinkler system comprises system riser 98, indicating-type floor control valve with supervisory switch 100, water flow switch 102, feed main 104, shunt 106, and drain and test conduit 108. The drain and test valve 10 of the present invention is affixed by virtue of pipe threads 26 into conduit 108. After passing through drain and test valve 10, water continues through drain and test conduit 108 to a drain.

Thus, it can be seen that the installation of the present drain and test valve is substantially less complicated and less expensive than that of the prior art, since only two thread make-ups need be made, as opposed to sixteen. Operation of the drain and test valve disclosed herein is also greatly facilitated since an operator needs only to rotate handle 78 in order to achieve a desired drain function or test function, and the drain and test conduit is conveniently closed as well by moving the handle to the off position. Contrary to the prior art, observation of the flow or lack thereof is made possible, regardless whether the drain and test valve is closed or is in a drain or test position.

Having thus described the invention in terms of detailed embodiments, it will be readily apparent to those skilled in the art that many modifications and variations may be introduced without departing from the inventive scope of the present teachings.

I claim:

1. A sprinkler drain and test valve unit for testing a sprinkler system, said drain and test valve unit comprising:
    a housing disposed in a conduit;
    an inlet and an outlet disposed on either end of said housing and serving to connect said housing to said conduit;
    a single ball valve disposed within said housing between said inlet and said outlet, said ball valve defining two channels providing communication between said inlet and said outlet, the first of said channels allowing a flow substantially equivalent to that of one sprinkler head in said system and the second of said channels allowing a flow substantially equivalent to that of said conduit to thus allow an unrestricted flow through said ball valve;
    a means for alternatively rotating said ball valve between a first position whereby said first channel provides communication between said inlet and said outlet, a second position whereby said second channel provides communication between said inlet and said outlet, a means for preventing communication between said inlet and said outlet; and
    a sight glass disposed within said housing downstream of said ball valve so as to permit observation of the flow through said ball valve.

2. The sprinkler drain and test valve unit of claim 1, wherein said means for preventing communication comprises a portion of said ball valve, whereby said means for rotating further alternatively rotates said ball valve to a third position, whereby said portion prevents communication between said inlet and said outlet.

3. The sprinkler drain and test valve unit of claim 1, wherein said two channels are disposed in the same equatorial plane of said ball valve and said means for rotating comprises a handle affixed to a shaft sharing a common axis with said ball valve and being attached to said ball valve, said axis being disposed perpendicularly to said plane.

4. The sprinkler drain and test valve unit of claim 3, wherein said means for rotating comprises a means for releasably holding said ball valve in a desired position.

5. The sprinkler drain and test valve unit of claim 4, wherein said means for releasably holding comprises a spring-loaded ball and a recess, one of said ball and recess being disposed on said handle and one being disposed on said housing adjacent to said handle, whereby said ball is releasably received within said recess when said ball valve is in said desired position.

6. The sprinkler drain and test valve unit of claim 2, wherein said two channels and said portion are disposed in the same equatorial plane of said ball valve and said means for rotating comprises a handle affixed to a shaft sharing a common axis with said ball valve and being attached to said ball valve, said axis being disposed perpendicularly to said plane.

7. The sprinkler drain and test valve unit of claim 6, wherein said means for rotating comprises a means for releasably holding said ball valve in a desired position.

8. The sprinkler drain and test valve unit of claim 7, wherein said means for releasably holding comprises a spring-loaded ball and a recess, one of said ball and recess being disposed on said handle and one being disposed on said housing adjacent to said handle, whereby said ball is releasably received within said recess when said ball valve is in said desired position.

9. The sprinkler drain and test valve unit of claim 1, wherein said sight glass comprises two windows disposed on either side of said housing.

10. The sprinkler drain and test valve unit of claim 9, wherein said windows are at least as wide as the interior diameter of said housing adjacent to said sight glass.

11. A method for testing and draining a sprinkler system comprising:
    a first step of providing a sprinkler drain and test valve unit for testing a sprinkler system, said drain and test valve unit comprising a housing disposed in a conduit, an inlet and an outlet disposed on either end of said housing and serving to connect said housing to said conduit, a single ball valve disposed within said housing between said inlet and said outlet, said ball valve defining two channels providing communication between said inlet and said outlet, the first of said channels allowing a flow substantially equivalent to that of one sprinkler head in said system and the second of said channels allowing a flow substantially equivalent to that of said conduit to thus allow an unrestricted flow through said ball valve, a means for alternatively rotating said ball valve between a first position whereby said first channel provides communication between said inlet and said outlet and a second position whereby said second channel provides communication between said inlet and said outlet, a means for preventing communication between said inlet and said outlet, and a sight glass disposed within said housing downstream of said ball valve so as to permit observation of the flow through said ball valve;
    a second step of rotating the ball valve of the sprinkler drain and test valve so that said first channel communicates between said inlet and said outlet in order to test said sprinkler system;
    a third step of rotating said ball valve so that said second channel communicates between said inlet and said outlet in order to drain said sprinkler system; and
    a fourth step of observing a flow or lack of flow through said housing downstream of said ball valve through said sight glass.

12. The method of claim 11 wherein said means for preventing communication comprises a portion of said ball valve, whereby said means for rotating further alternatively rotates said ball valve to a third position, whereby said portion prevents communication between said inlet and said outlet, and wherein said method comprises a further step of rotating said ball valve so that said portion prevents communication between said inlet and said outlet.

* * * * *